(No Model.)

C. PARHAM.
LATHE CHUCK.

No. 262,612. Patented Aug. 15, 1882.

WITNESSES:
Geo. B. Collier
Geo. T. Kelly

INVENTOR
Chas. Parham,
by Collier & Bell,
Attys.

UNITED STATES PATENT OFFICE.

CHARLES PARHAM, OF PHILADELPHIA, PENNSYLVANIA.

LATHE-CHUCK.

SPECIFICATION forming part of Letters Patent No. 262,612, dated August 15, 1882.

Application filed April 5, 1882. (No model.)

*To all whom it may concern:*

Be it known that I, CHARLES PARHAM, of the city and county of Philadelphia, in the State of Pennsylvania, have invented certain new and useful Improvements in Lathe-Chucks, of which improvements the following is a specification.

My invention relates to chucks specially designed for and adapted to use in machines for turning and cutting screw-threads on wire or rods, in which machines the material operated on is fed longitudinally through a hollow rotating mandrel to the tools or cutters, and the completed sections successively cut off in desired lengths.

The object of my invention is to provide simple and effective means for firmly clamping the wire or rod within the mandrel while being acted upon by the cutting and screw-threading tools, and releasing it, as from time to time required, to admit of the longitudinal feed of the work, without in either case necessitating the stoppage of the mandrel or disturbing the relation of any members of the operative mechanism.

To these ends my improvements consist in the combination of a socket, two or more jaws fitting therein, clamping-screws engaging threads in the socket and having spur-pinions secured upon their outer ends, and racks secured to a collar fitted to slide longitudinally upon the socket, each of said racks engaging the pinion of one of the clamping-screws and serving to move said screw toward and from the axis of the socket.

The improvements claimed are hereinafter more fully set forth.

Figure 1:
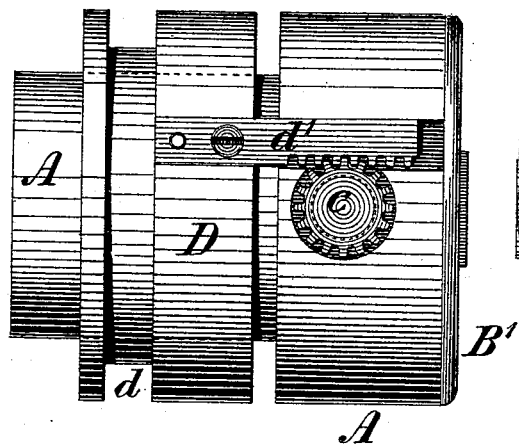
Figure 2:
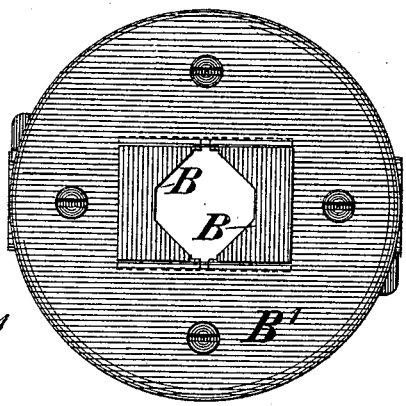
Figure 5:
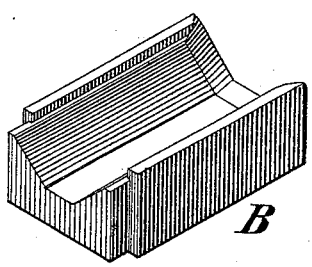
Figure 3:
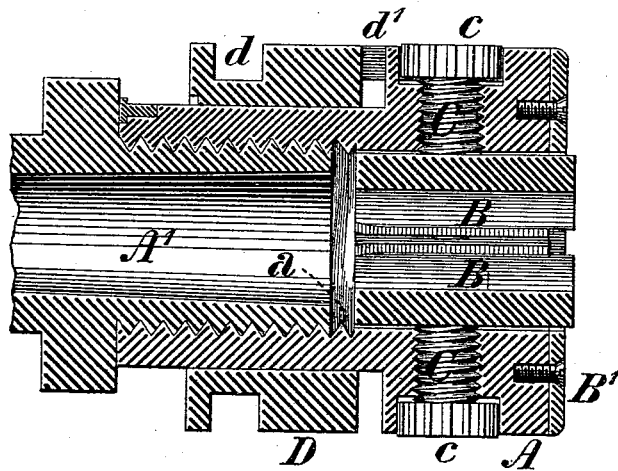
Figure 4:
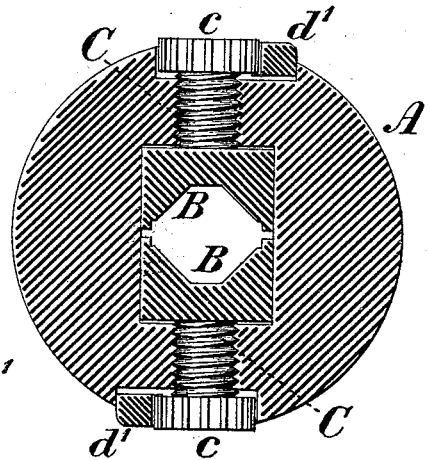

In the accompanying drawings, Figure 1 is a side view, in elevation, of a chuck embodying my improvements; Fig. 2, an end view of the same; Figs. 3 and 4, longitudinal and transverse sections, respectively, of the same; and Fig. 5, a view in perspective of one of the jaws detached.

To carry out my invention I provide a cylindrical metallic socket, A, which is adapted to be secured upon the hollow mandrel A' of a lathe or screw machine by having a female thread, $a$, cut centrally within it for a portion of its length.

Two or more jaws, B, each having a longitudinal recess of angular or segmental section, are fitted in a central recess in the socket A, so as to be movable freely toward and from the axis thereof, and are maintained in position longitudinally by a cap, B', secured to the end of the socket, said cap fitting against lateral shoulders on the jaws. (Shown in Fig. 5 and indicated by dotted lines in Fig. 2.)

Clamping-screws C, corresponding in number to the jaws, engage female threads in the socket, each of the screws C having a spur-pinion, $c$, formed on or secured to its outer end, and being located radially to the socket and in line with the center of one of the jaws B, against which its inner end bears when projected into the recess in which the jaws rest.

A sleeve, D, having an annular groove, $d$, formed on its periphery to receive the forked end of a shifter or shipping-lever, is fitted freely upon the periphery of the socket A, so as to be susceptible of movement longitudinally thereon without reference to or interference with the rotation thereof.

Racks $d'$, each of which engages one of the pinions $c$ of the clamping-screws C, are secured in recesses formed in the periphery of the sleeve D, so that by the movement of the sleeve rotation is imparted to the pinions and the attached clamping-screws, such rotation, when effected in one direction, acting to compress the jaws B upon the wire or rod and retain it firmly in position, and in the other direction to withdraw the clamping-screws from their bearing upon the jaws, and thereby permit the latter to rest freely in their recess and allow of the desired longitudinal feed being imparted to the wire or rod.

It will be observed that as the jaws bear upon the wire throughout their entire length they are thereby adapted to grasp it with a greater degree of firmness than do the tapered jaws heretofore employed in machines of the class for which my invention is designed, and, owing to the uniform distribution of pressure which is exerted upon them in operation, they are correspondingly stronger and more durable than tapered jaws. The facility afforded of clamping and releasing the wire without interrupting the rotation of the mandrel effects a substantial economy of time and labor, and the operative mechanism is of comparatively inexpensive construction and free from liability to derangement or failure in action.

In lieu of a single pair of angular-faced jaws, as shown in the drawings, three or more segmental jaws and a corresponding number of clamping-screws, pinions, and racks may be employed where the character of the work is such as to render the exertion of a greater degree of clamping action necessary or desirable, the operative relation of the several members being, in such case, identical with that of the construction illustrated.

I claim as my invention and desire to secure by Letters Patent—

The combination, substantially as set forth, of a socket, jaws fitting freely in a recess therein, clamping-screws each of which engages a thread in the socket and is adapted to bear at its inner end upon one of the jaws, spur-pinions formed or secured on the outer ends of the clamping-screws, and a collar fitted to slide longitudinally upon the socket and carrying a series of racks each of which engages the pinion of one of the clamping-screws.

CHAS. PARHAM.

Witnesses:
CARROLL R. WILLIAMS,
FRANK F. SOWER.